April 5, 1960 C. A. KING 2,931,449
OCCUPANT-CONTROLLED, SELF-PROPELLED, OBSTRUCTION-CLIMBING
VEHICLE
Filed Nov. 12, 1958 4 Sheets-Sheet 1

INVENTOR
CARL A. KING

BY W. E. Sherwood
ATTORNEY

April 5, 1960 C. A. KING 2,931,449
OCCUPANT-CONTROLLED, SELF-PROPELLED, OBSTRUCTION-CLIMBING
VEHICLE
Filed Nov. 12, 1958 4 Sheets-Sheet 2
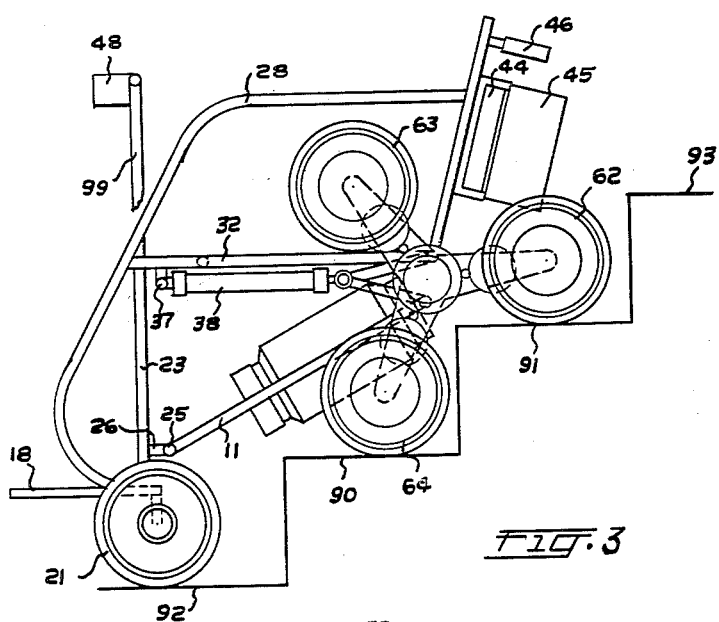
FIG. 3
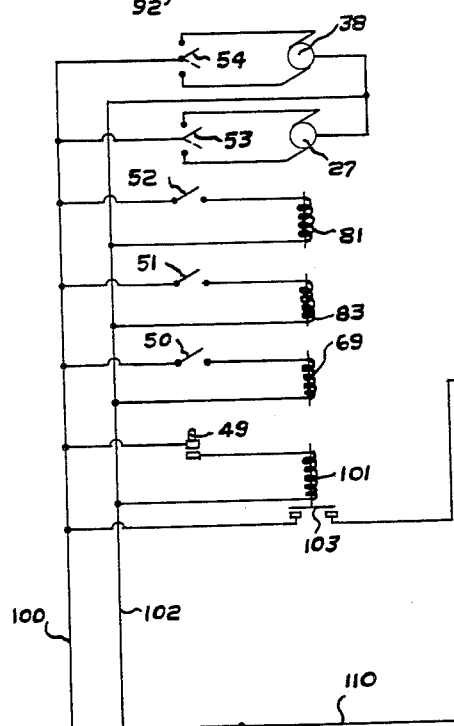
FIG. 9
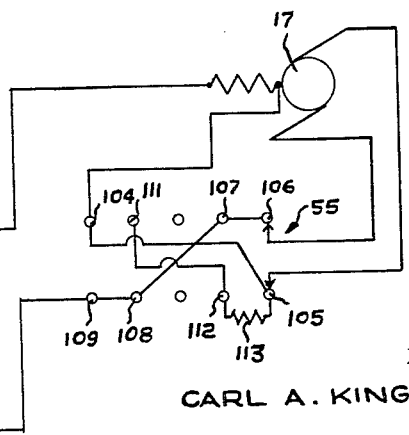
INVENTOR
CARL A. KING
BY W. E. Sherwood
ATTORNEY April 5, 1960  C. A. KING  2,931,449
OCCUPANT-CONTROLLED, SELF-PROPELLED, OBSTRUCTION-CLIMBING
VEHICLE
Filed Nov. 12, 1958  4 Sheets-Sheet 3

INVENTOR
CARL A. KING

BY  W. E. Sherwood
ATTORNEY

April 5, 1960 C. A. KING 2,931,449
OCCUPANT-CONTROLLED, SELF-PROPELLED, OBSTRUCTION-CLIMBING
VEHICLE
Filed Nov. 12, 1958 4 Sheets-Sheet 4

INVENTOR
CARL A. KING

BY  W. E. Sherwood
ATTORNEY

United States Patent Office 2,931,449
Patented Apr. 5, 1960

2,931,449

OCCUPANT-CONTROLLED, SELF-PROPELLED, OBSTRUCTION-CLIMBING VEHICLE

Carl A. King, Lexington, Ky., assignor, by mesne assignments, to The Kentucky Research Foundation, Lexington, Ky., a corporation of Kentucky Application November 12, 1958, Serial No. 773,346

7 Claims. (Cl. 180—8)

This invention relates to an improved self-propelled vehicle, the operation of which is controlled by the occupant of the same and which vehicle is adapted to move over obstructions as well as to travel along a smooth surface. More particularly, it relates to vehicles of this type which are constructed to serve as invalid chairs.

Many vehicles of this nature have been proposed heretofore, but, so far as I am aware, all such proposals have been attended by certain disadvantages which it is a purpose of my invention to overcome. For example, one class of such vehicles embodies the use of endless belts or tracks driven by a motor carried by the vehicle and adapted to engage with an obstruction and to carry the vehicle and occupant thereover. Such belts, however, entail a maintenance problem in that they become worn, stretch, and require frequent adjustment and replacement.

Another class of such vehicles embodies the use of lifting or stepping means for wheels at the rear of the vehicle, as, for example, the well-known star wheel or extensible lifter constructions actuated by a prime mover on the vehicle. While these mechanical arrangements offer a solution not found in the endless belt constructions, they have, however, been generally limited to the climbing of a single curb or step, or to use when an attendant is present to help in controlling the movement of the vehicle over a closely spaced series of such obstructions, such as stairs.

An object of my invention is to provide a wheeled vehicle of a type suitable for use as an invalid chair and which may travel on a level surface or over obstructions while remaining solely under the control of the occupant.

Another object is to provide a vehicle of this type characterized by its inherent safety and comfort for the occupant.

Another object is to provide a vehicle of this type which may travel at one speed while on a level surface and at a lower speed while climbing an obstruction, the same drive motor being employed for actuating the vehicle at both speeds.

Another object is to provide a self-propelled invalid chair wherein the seat for the occupant is adjustable.

A further object is to provide an improved invalid chair having simple control means within reach of the occupant for causing the chair to be propelled with safety at the will of the occupant either along a level surface or over obstructions.

A further object is to provide an improved, self-propelled, invalid chair of compact construction suitable for passing through normal sized doorways and adapted for usages wherein conventional invalid chairs may be employed.

Other objects and advantages will become apparent as the description proceeds and when considered in conjunction with the accompanying drawings in which:

Fig. 3 is a side elevation view of the chair of Fig. 1 showing the relation of the several parts while climbing a series of steps.

Fig. 9 is a wiring diagram for the controls and motors of the chair; and

In accordance with the invention there is provided an invalid chair which has a vehicular frame on which front and rear axles are mounted and with a chair frame which is adjustable at the choice of the occupant. The front axle supports at least one front wheel which is steered by the occupant and the rear axle mounts a pair of forks which are selectively engageable with and disengageable from a drive shaft housed in the rear axle. Each fork carries a plurality of wheels, the axis of a wheel on each fork being coaxial with a corresponding wheel on the other fork. Means under the control of the occupant provide for the adjusting of the chair frame; the engagement with and disengagement from the drive shaft of these forks; and the suitable positioning of the forks for travel of the chair on a level surface or for travel over obstructions. A prime mover controlled by the occupant serves to turn the drive shaft and an optional braking means also under the control of the occupant is available to serve as an additional safety means. The assembly is characterized by a relatively low center of gravity and is compactly arranged to permit maneuvering of the chair through normal sized doorways and the like, all of which contribute to safety, comfort, and a sense of independence on the part of the occupant.

Figure 4:
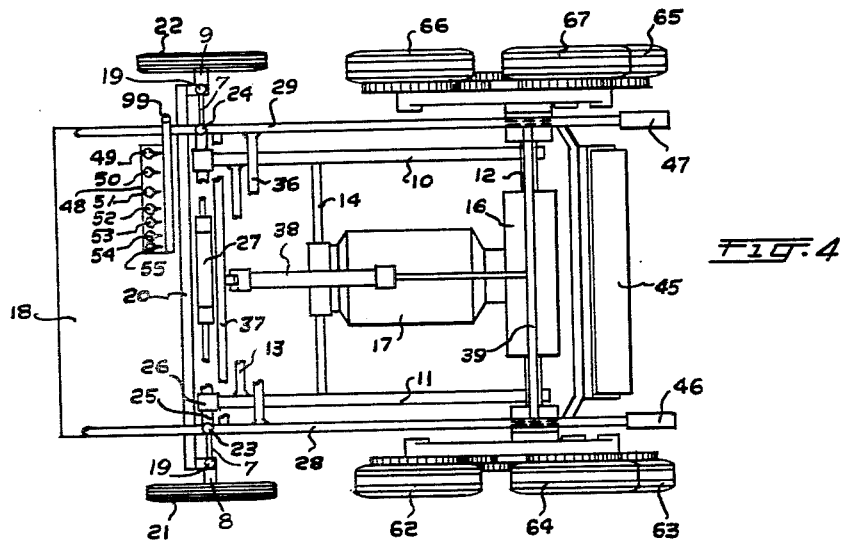
Fig. 4 is a plan view of the chair of Fig. 1 with the seat removed and with parts broken away better to show the frame structure and fragmentary parts of the steering mechanism.

Referring now to Fig. 4, a vehicular rigid framework, for example, of metal tubing, may comprise a pair of spaced side members 10 and 11 connected to a rear axle housing 12 and having a front cross brace 13 and a central cross brace 14. Extending through the rear axle housing is a drive shaft 15 (Fig. 6) which is driven by suitable gears in gear reduction box 16 mounted on the rear axle housing. A prime mover 17 which may conveniently comprise a 12 volt D.C. reversible electric motor serves to drive the gears housed in the gear box and this motor in turn is mounted rigidly upon the vehicular framework with a suitable ground clearance.

In one form of the chair, the adjustable chair framework may be mounted in articulated relation to the vehicular framework. In this arrangement, the forwardly projecting foot rest 18 and a reinforcing cross member 20 serving as a front axle support are provided and with that member carrying at its ends the customary yokes within which the customary king pins 19 are journalled. Short axle members 8 and 9 attached to these king pins mount respectively the ground engaging wheels 21 and 22. Rigidly attached to the respective king pins for actuation of the same, are the customary links connected together by tie rod 7, the respective ends of which are shown in Fig. 4 and which rod in turn is moved as a unit by a suitable actuating means under control of the occupant of the vehicle, as will later appear. Movement of the tie rod effects steering of the front wheels in unison. It will be understood that any conventional steering linkage using either the two front wheels as shown or a single front wheel, may be used. However, when two front wheels are employed a somewhat better stability results when climbing or descending stairs.

Upstanding from the foot rest and rigidly attached thereto is a pair of spaced side supports 23 and 24, having brackets thereon carrying a cross brace 25 pivotally mounted upon the forward ends of the vehicular frame members 10 and 11, one such bracket being shown at 26. Suitably mounted upon the cross brace 25 is a motor driven linear actuator 27 connected to the tie rod 7 by a conventional linkage (not shown) for steering the front wheels. Any conventional actuator may be employed and as such forms no portion of the present invention. It has been found, for example, that the Lear Model 420 Series Linear Actuator having a compactly arranged reversible electric motor and an extensible and retractable element, is well suited for the present usage.

Extending upwardly from the foot rest and rigidly attached to the side supports is a pair of arm members 28 and 29 of the chair framework. At their rearmost ends these arm members are rigidly attached to spaced generally vertical back frame members 33 and 34 across which are mounted generally horizontal back frame members 30 and 31. A pair of side frame members, one being shown at 32, rigidly connect at one end with the arm members and at the other end with the pair of back frame members 33 and 34, which are also braced by a cross member 35. Moreover, a front cross brace 36 between these side frame members serves as a rest for the chair seat (not shown).

Figure 1:
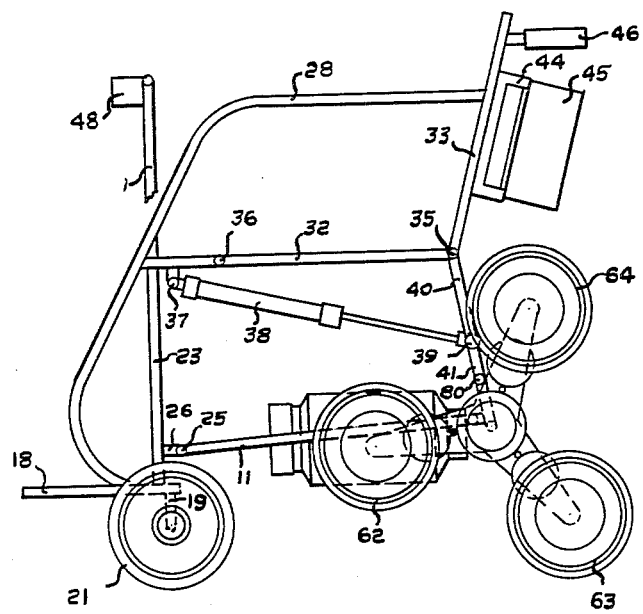
Fig. 1 is a side elevation view of an invalid chair embodying the invention and shown in normal travelling position; parts of the assembly being broken away and omitted in the interests of simplification.
Figure 2:
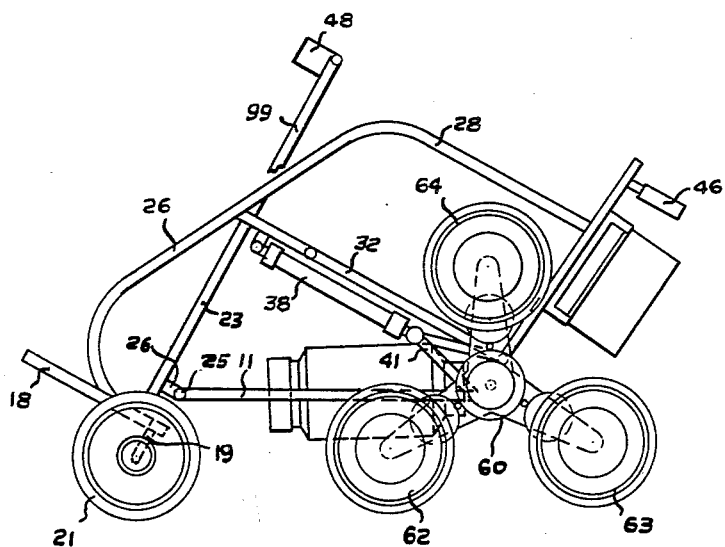
Fig. 2 is a side elevation view of the chair of Fig. 1 occupying a position preparatory to passing over an obstruction.

As a feature of the invention, the thus-described chair framework is made tiltable at the option of the occupant. To accomplish this action, a cross brace 37 joins the side frame members near their forward ends and has pivotally mounted thereon near the center line of the chair, a second motor driven linear actuator 38 of the type above described. The end of the linear element is suitably connected to a cross member 39 having pairs of links 40, 41 and 42, 43 pivotally attached thereto adjacent the ends of that cross member. Links 40 and 42 have one end pivotally attached to the cross member 35 and their other ends pivotally attached to member 39 whereas links 41 and 43 have one end pivotally attached to cross member 39 and their other ends pivotally attached to the rear axle housing. Thus, as the motor 38 is driven in one direction, it causes the respective links at each side of the chair to move together, as seen in Fig. 2, and when driven in the other direction, causes those links to separate, as seen in Fig. 1. During these respective movements, the chair is tilted rearwardly and is raised to an upright position.

It will be understood that a suitable back and seat means are normally supported upon the described chair framework. The braces 30 and 31 may conveniently serve as supports for a conventional electric battery 44 and battery charger 45, the weight of which acts as a counter-balance for the occupant when the chair is moving over an obstruction, as seen in Fig. 3. Handles 46 and 47 also may be provided for use by an attendant during the special non-self-propelled condition of operation later to be described.

Mounted upon the foot rest at a suitable location, preferably at the right hand side thereof, is an upright tubular member 99 adapted to contain electrical wiring and having a transverse extension above the lap of the occupant of the chair. This member supports a control panel 48 having thereon a plurality of switches 49, 50, 51, 52, 53, 54 and 55, the purpose of which will later appear.

As a feature of the invention, I provide a pair of forks or spiders 60 and 61 each adapted to support at the extremities of its arms a ground engaging wheel. The invention in its broader aspects comprehends the use of a plurality of such wheels on each fork, not being limited to three wheels as shown. I have found, however, that when only two such wheels are used, a much rougher travel is obtained and when four such wheels are used for climbing normal stair risers, the center of gravity of the chair is raised considerably. As shown in the preferred form, fork 60 carries wheels 62, 63 and 64 equally spaced angularly of the rear axle and fork 61 carries similar wheels 65, 66 and 67 and with the axis of each wheel on each fork being co-axial with its corresponding wheel on the other fork. The diameter of each of these rear wheels, moreover, preferably is equal to the diameter of the front wheels of the chair.

Figure 5:
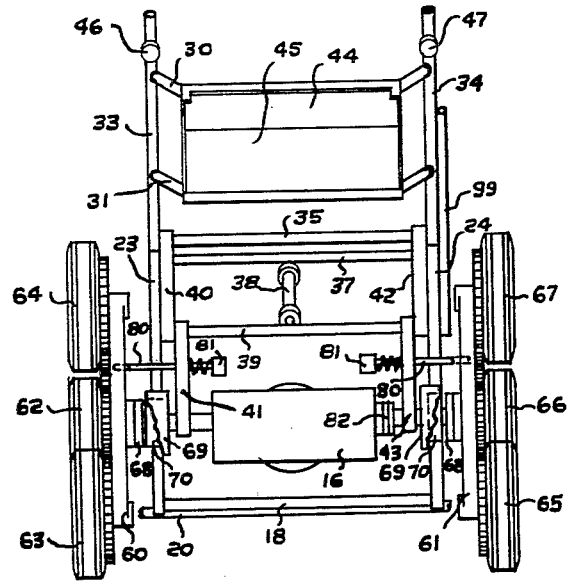
Fig. 5 is a rear end view of the chair of Fig. 1.
Figures 7, 8:
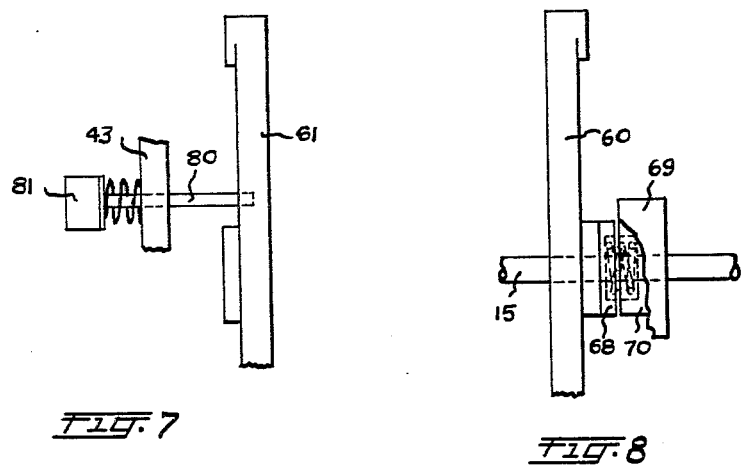
Fig. 7 is a detail of one means for holding the fork in travelling positions of the chair.
Fig. 8 is a detail of one form of clutch arrangement for the fork.

As noted in Figs. 5 and 8, the hub of each fork is formed with an aperture through which the drive shaft 15 extends. Supported on the hub of the fork is a clutch element 68 associated with a conventional solenoid 69. Carried by shaft 15 for selective engagement with the clutch element 68 is a second and slidable clutch element 70 which rotates with the shaft at all times and is held normally disengaged from the fork clutch element as by a suitable spring. Thus, when the occupant presses upon a single pole, single throw solenoid switch 50, for example, the solenoids in each fork serve to engage the fork clutch faces 68 with the clutch faces 70 and those forks are then rotated by the rotating drive shaft 15 at shaft speed. When pressure upon the switch is relieved, the clutches are then disengaged.

Figures 6, 10:
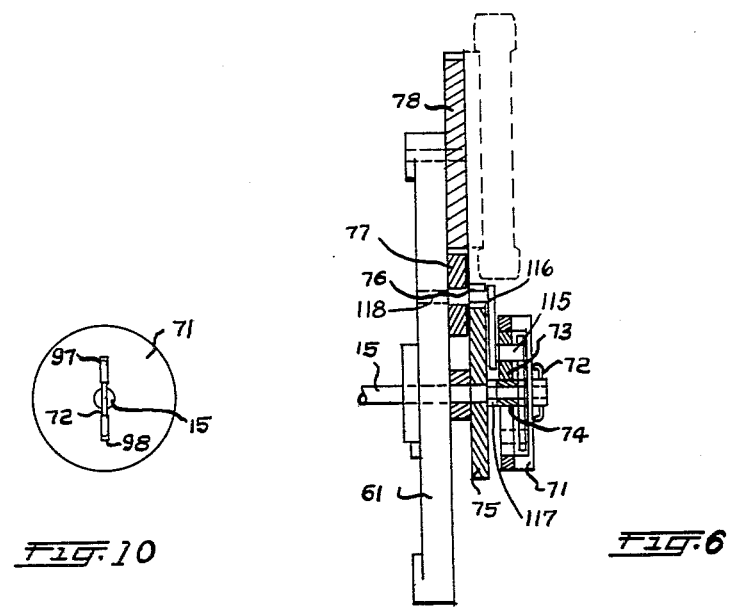
Fig. 6 is a detail view, partly in section, of a gearing arrangement for driving the rear wheels.
Fig. 10 is a detail showing one form of key for connecting the gearing of Fig. 6 to the driven shaft.

Considering now Fig. 6, which shows the drive means for fork 61 and its associated ground wheels, the companion fork 60 having a similar construction, it will be noted that upon the turning of shaft 15, a planetary ring gear 71 which is detachably keyed to the shaft by key 72, also turns. Assuming the vehicle to be driving forward at full speed, as indicated in Fig. 1, and with the forks declutched from the drive shaft 15, ring gear 71 then drives the idler gears 73 which are rotatably and loosely mounted on stub axles 115 projecting from vertically positioned arms 116, one such arm and axle being seen in Fig. 6. These idler gears in turn drive center gear 74 rotatably and loosely mounted on the shaft and attached to the enlarged gear 75, also rotatably and loosely mounted on the shaft 15 and attached to that center gear by a hollow tube 117. This enlarged gear drives a pinion gear 76 for each of the rear wheels (one only being shown on dotted lines in Fig. 6). This pinion in turn drives the intermediate gear 77 to which it is attached, and the intermediate gear meshes with the wheel gear 78 attached to the wheel and journalled at the apex of one of the fork arms. The plates 116 have rigidly attached thereto a suitable gear supporting stub axle 118 which as indicated in dotted lines in Fig. 6, is rigidly mounted at one end in the fork 61. Both the pinion gear 76 and the intermediate gear 77 are rotatably mounted loosely on axle 118, and with these gears rigidly connected to each other. By suitable choice of gear sizes and wheel sizes, a rotation of 8 r.p.m. of shaft 15 may thus be translated into a forward speed of about 3 miles per hour for the vehicle. Of course, a reverse rotation of shaft 15 at the same r.p.m. will give a rearward movement of the same speed, although normally this is not required. By contrast, when the clutches are engaged, the forks themselves turn at shaft speed of about 8 r.p.m. or less. It will also be appreciated that when the planetary gear is operating, all three of the wheels on each fork are being rotated at the same speed simultaneously.

As will later appear, means are provided to reduce the speed of shaft 15 when moving the vehicle over an obstruction and this may take various forms without departing from the invention, although it is preferred to reduce such speed by interposing an easily controlled resistor into the motor circuit.

On occasions when it is desired to convert the vehicle to a non-self-propelled usage, as when an attendant is available, this may readily be done by disconnecting the fork assemblies from the drive shaft. As seen in Fig. 10, the key member 72 may be disengaged manually from within the end of shaft 15 and may have projecting portions engageable, when manually reset, within recesses 97 and 98 in the outer surface of ring gear 71, as when the drive from the shaft is later to be employed.

As a further feature of the invention, provision is made to insure that only one pair of ground engaging wheels at the rear of the chair are in contact with the ground during normal forward or rearward movement. In this way an improved steering of the vehicle may be accomplished. As best seen in Figs. 5 and 7, the lower links 41 and 43 are furnished with apertures slidably mounting lifter pins 80 which are sufficiently long to extend into the plane of rotation of the respective forks. These pins are preferably biased into engaging position with those forks as by means of a spring. They also have a solenoid 81 operable by a single pole single throw switch 52 for example, for moving the pins to withdrawn position. The location of the lifter pins is such that, when the chair is erect, as is normal during forward travel, and as the two non-ground engaging wheels of each of the forks are rotating, as occurs during forward travel, the weight of the wheels and the momentum of the rotating wheels, tend to hold the forks securely against those lifting pins. When, however, it is desired to settle the chair upon the ground, as in Fig. 2, preparatory to backing over an obstruction, the respective pins are readily withdrawn and held in withdrawn position by actuation of switch 52.

It has been found that the interengagement of the various gears normally serve to prevent any overrun of the chair when in motion, but, if desired as an additional safety factor, and as a further contribution to the occupant's peace of mind, a conventional solenoid operated brake 82 may be mounted upon shaft 15 adjacent the gear box 16 in order to prevent or slow rotation of that shaft. Such a brake may conveniently be actuated by a single pole single throw switch 51 controlling a solenoid 83.

With the foregoing description in mind, various operations using the chair under sole control of its occupant may be carried out as follows and with reference to the wiring digram of Fig. 9.

With the chair in normal erect position, the occupant, who need only have use of his fingers, presses upon push button 49 which for safety must be kept depressed during all driven movements of the chair. Upon depressing this master control means, current flows from battery 44 through conductor 100, push button 49, and master solenoid 101 which while energized, closes switch 103 whereupon current flows from conductor 100 to the field of the series motor 17, thence to terminal 104 corresponding to the high speed reverse for the motor. From terminal 104 a shunt extends to terminal 105 corresponding to the high speed forward for the motor. With directional and speed control switch 55, which is constructed for multi-position settings, positioned as seen in Fig. 9, current then flows through this switch to the armature of motor 17 causing it to turn and at the same time flows to the other pole of switch 55 and to terminal 106, shunted terminal 107, shunted terminal 108, shunted terminal 109, and return conductor 110. Terminal 111 represents the low speed reverse position and terminal 112 represents the low speed forward position, these terminals being connected by a shunt and terminals 112 and 105 being connected by a resistor 113. Off-position terminals also are provided for the switch 55. As motor 17 turns at high speed forward, it then drives shaft 15 through gear box 16 and the forks being declutched, the respective planetary gears drive all of the rear wheels on both forks. At this time, the lifter pins are engaged with the forks and the rear wheels 63 and 65 are in contact with the ground. Should it be desired to travel forwardly at reduced speed, switch 55 is moved so that its poles are across terminals 107 and 112, thus including resistor 113 in the circuit and resulting in a substantially slower speed of the motor 17. While travelling either forwardly or rearwardly, the occupant by shifting the double throw switch 53 may actuate motor 27 to cause the necessary extension or retraction of its projecting member attached to the tie rods and which effects the steering of the front wheels 21 and 22.

When it is desired to pass over an obstruction or to climb a series of steps such as 90, 91, in order to move from ground level 92 to an upper level 93, or conversely to descend from the upper level to the lower level, an adjustment of the setting of the chair framework normally is desired. In this case, the chair is maneuvered until the rear wheels in engagement with the ground are near the edge of the obstruction to be climbed. The occupant then shifts the double throw switch 54 to cause motor 38 to retract its projecting member whereupon the crossbrace 39 is drawn toward the motor causing the respective pairs of links to move toward each other. As this occurs, the cross brace 35 at the rear of the chair is drawn downwardly and the chair framework pivots about the front cross brace 25 of the vehicular frame. This action shifts the center of gravity of the chair and leaves the occupant near the ground level 92 and rearwardly. Simultaneously, the occupant may also close switch 52 thus actuating the solenoids 81 and retracting the lifter pins from the plane of movement of the forks. At this time, two of the wheels on each fork are in contact with the ground as seen in Fig. 2. The vehicle may then be moved slowly rearwardly until wheels 63 and 65, for example, touch the riser portion of the first obstruction.

When this occurs, the occupant then moves switch 50 to energize the clutch solenoids 69. Switch 55 is then moved to slow-speed rearwardly and as motor 17 begins to turn the shaft 15, both forks turn with that shaft, being engaged therewith by their respective clutches. At this time, the wheels 63 and 65 press against the initial obstruction and slip with respect thereto as the forks turn. As the wheels continue to slip, the forks bring the next pair of wheels 64 and 67 into engagement with the next obstruction, such as step 90 in Fig. 3. In turn, the wheels 62 and 66 are brought into engagement with the next obstruction, such as step 91 and this sequential action occurs as the vehicle climbs the stairs. When front wheels 21 and 22 meet the several obstructions, they are pulled upwardly and rearwardly thereover, by the motive power furnished by the rotating forks.

Upon completion of the climbing operation and with the front wheels now resting upon the same level as the rear wheels, as seen in Fig. 2, the occupant may then raise the chair to erect position, disengage the clutches of the forks, reengage the lifter pins, and proceed to maneuver the vehicle.

In descending the stairs, the occupant first approaches the edge of the top stair and adjusts the chair framework to lowered position. The front wheels are permitted to drop over the first riser with one set of rear wheels on the forks adjacent the top edge of that riser. At this time, the brake 82 may be energized by means of switch 51 as a precautionary measure. With the chair in position for the descent, the lifter pins are disengaged, the fork clutches are engaged, and the brake is released. With switch 55 then set for slow speed forward, the forks then drive the vehicle down the stairs in the same manner as above described for the climbing operation. Upon reaching the lower level with the chair lowered as shown in Fig. 2, the occupant then raises the chair to upright position, disengages the clutches, reengages the lifter pins, and proceeds to maneuver the vehicle.

Whereas, the structure and operation as described relates to use by a severely handicapped occupant, it will be understood that various features of the invention may be simplified without departing from the true spirit and scope of the invention. For example, with less severely handicapped users, the motor driven steering apparatus may be omitted and the upright member 99 may also be used as a steering tiller member by being attached to the tie rods for the front wheels. Similarly, a hydraulic means operable by a hand lever may be used to adjust the chair framework in lieu of the electric motor 38. As seen in Figs. 4 and 5, the overall width and height of the improved chair need be no greater than that of conventional wheel chairs. The weight of the drive motor, gear reduction box, shaft and fork gears is disposed relatively near the ground consistent with ground and obstruction clearance and despite the elevated location of the battery and occupant, results in a low center of gravity for the vehicle as a whole.

The invention is not limited to the special embodiment as shown and described but on the contrary various modifications may be made within the scope of the invention.

What is claimed is:

1. An occupant-controlled, self-propelled, obstruction-climbing vehicle comprising in combination, a vehicle frame, a front axle supported upon said frame and mounting at least one front wheel, means for steering said front wheel, a rear axle mounted upon said frame and supporting a drive shaft having a driving gear adjacent each end thereof, forks mounted upon said shaft adjacent the ends thereof, each of said forks mounting a plurality of rear wheels with the axes of wheels on one fork being coaxial with the axes of corresponding wheels on the other fork and with a single one, and not necessarily the same single one at all times, of said rear wheels on each fork serving to support said vehicle during its travel along a level surface, a clutch means for selectively engaging and disengaging said forks with and from said shaft, a gear rigidly attached to each of said rear wheels and driven from the respective driving gears on said shaft, power means mounted upon said frame for driving said shaft, and control means mounted upon said vehicle within reach of said occupant for actuating said power means, said steering means and said clutch means, whereby when said power means drives said shaft with the clutch engaged, said forks rotate and simultaneously impart a combined stepping and a propelling action to said vehicle and when said power means drives said shaft with the clutch disengaged, said vehicle receives only a propelling action.

2. A vehicle as defined in claim 1 wherein said power means drives said shaft in either of two directions thereby to propel the vehicle forwardly or rearwardly, and said control means selectively governs the direction of vehicle propulsion.

3. A vehicle as defined in claim 1 wherein said gear on each of said respective rear wheels and said driving gear on said shaft are interconnected by a gear having a ratio sufficient to rotate said rear wheel faster than the rotation of said shaft.

4. A vehicle as defined in claim 3 wherein said interconnecting gear comprises a planetary gear.

5. A vehicle as defined in claim 1 including means for varying the speed of said power means thereby to effect a slower rotation of said shaft during said combined stepping and propelling action than during said propelling action alone.

6. An occupant-controlled, self-propelled, obstruction-climbing invalid chair comprising in combination, a vehicle frame, a chair frame tiltably mounted upon said vehicle frame, tilting motor means for selectively tilting said chair frame, a front axle supported upon said chair frame and mounting at least one front wheel, means for steering said front wheel, a rear axle mounted upon said vehicle frame and supporting a drive shaft having a driving gear adjacent each end thereof, forks mounted upon said shaft adjacent the ends thereof, each of said forks mounting a plurality of rear wheels with the axes of wheels on one fork being coaxial with the axes of corresponding wheels on the other fork and with a single one, and not necessarily the same single one at all times, of said rear wheels on each fork serving to support said vehicle during its travel along a level surface, clutch means for selectively engaging and disengaging said forks with and from said shaft, a gear rigidly attached to each of said rear wheels and driven from the respective driving gears on said shaft, power means mounted upon said vehicle frame for driving said shaft, and control means mounted upon said vehicle within reach of the occupant for actuating said power means, said steering means, said tilting motor means, and said clutch means whereby when said power means drives said shaft with the clutch engaged, said forks rotate and simultaneously impart a combined stepping and propelling action to said vehicle and when said power means drives said shaft with the clutch disengaged, said vehicle receives only a propelling action.

7. An invalid chair as defined in claim 6 including link means pivotally attached to the rear of said chair frame and to said vehicle frame and actuated by said tilting motor means, said links being movable between a first position in which said chair frame is held in upright position and a second position in which said chair frame is held in a rearwardly tilted and lowered position.

References Cited in the file of this patent

UNITED STATES PATENTS

| | | |
|---|---|---|
| 2,400,824 | Jackson | May 21, 1946 |
| 2,476,769 | Rideout | July 19, 1949 |
| 2,742,973 | Johannesen | Apr. 24, 1956 |
| 2,798,565 | Rosenthal | July 9, 1957 |

FOREIGN PATENTS

| | | |
|---|---|---|
| 577,797 | Germany | July 13, 1932 |